United States Patent [19]

Cory

[11] 4,415,067
[45] Nov. 15, 1983

[54] LIQUID COOLED BRAKE UNIT

[75] Inventor: Halsey W. Cory, Fairfield, Ohio

[73] Assignee: Force Control Industries, Inc., Fairfield, Ohio

[21] Appl. No.: 268,339

[22] Filed: May 29, 1981

[51] Int. Cl.³ .................................. F16D 55/36
[52] U.S. Cl. ..................... 188/71.5; 188/71.6; 188/72.3; 188/170; 188/264 D; 188/264 P
[58] Field of Search ............... 188/71.6, 71.5, 72.3, 188/264 D, 264 B, 264 E, 264 F, 264 P, 264 CC, 264 R, 170, 72.4, 72.1, 18 A, 171, 73.32, 366, 367, 369; 192/18 A, 113 B, 70.2

[56] References Cited

U.S. PATENT DOCUMENTS

| | | | |
|---|---|---|---|
| 2,025,098 | 12/1935 | Dudick | 188/171 |
| 2,964,137 | 12/1960 | Luedtke et al. | 188/71.5 |
| 3,033,329 | 5/1962 | Malloy | 188/71.6 X |
| 3,586,134 | 6/1971 | Westfall | 188/71.6 |
| 3,638,773 | 2/1972 | Lewis et al. | 192/18 A |
| 3,680,666 | 8/1972 | Sommer | 188/170 |
| 3,924,715 | 12/1975 | Cory | 192/18 A |
| 4,113,067 | 9/1978 | Coons et al. | 188/71.6 |

Primary Examiner—Douglas C. Butler
Attorney, Agent, or Firm—Jacox & Meckstroth

[57] ABSTRACT

An electric motor has a shaft projecting from an end bearing bracket, and an annular hub member is clamped to the projecting portion of the motor shaft. The hub member supports a plurality of clutch discs and defines an impeller inlet for receiving a liquid coolant or oil which is pumped by the hub member through ports outwardly between the discs. A housing includes a section which mounts on the motor bearing bracket, and the housing has an intermediate section which supports a plurality of non-rotating brake plates. The brake plates interfit between the brake discs and are pressed together with the discs in response to axial movement of a non-rotating annular piston surrounding the hub member and supported by the intermediate section of the housing. The housing also has an end closure portion which directs the oil from the discs and plates to the inlet within the hub member and is effective to dissipate heat from the recirculating oil.

16 Claims, 3 Drawing Figures

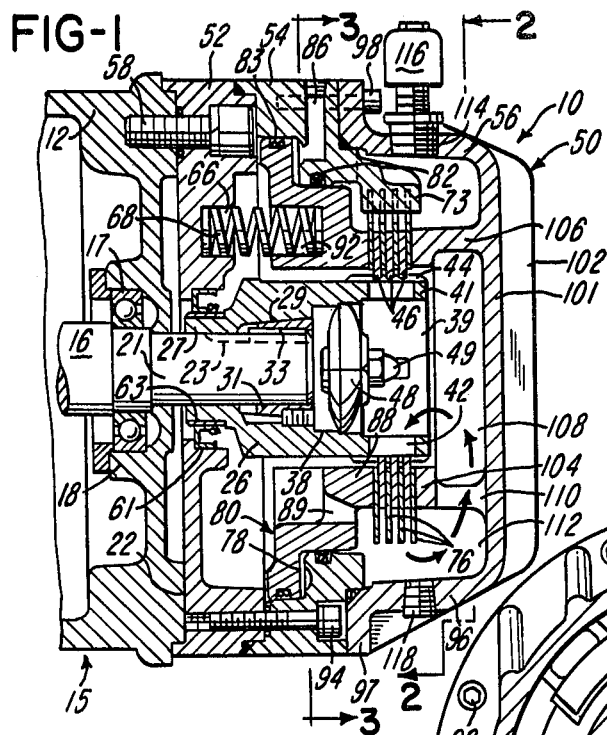

LIQUID COOLED BRAKE UNIT

BACKGROUND OF THE INVENTION

In the art of multiple discs brake units which mount on an end bearing bracket of an electric motor for braking a projecting end portion of the motor shaft, for example as disclosed in U.S. Pat. Nos. 2,025,098, 2,964,137 and 3,680,666, it has been found desireable to use a liquid coolant or oil within the brake unit for dissipating the friction heat produced when the brake discs and brake plates are clamped together. For example, the above-mentioned U.S. Pat. No. 3,680,666 discloses two motor brake units each of which includes a housing enclosing a supply of cooling fluid or oil which is used for transferring heat. U.S. Pat. Nos. 3,638,773 and 3,924,715, which issued to Applicant's Assignee, disclose clutch-brake units of the oil-shear type and wherein a cooling oil is recirculated to provide for dissipating friction heat in addition to providing a lubricating fluid to extend the operational life of the unit.

In a motor brake unit of the general type disclosed in above mentioned U.S. Pat. No. 3,680,666, it has been found highly desirable to provide for effective and positive recirculation of the oil within the brake unit to prevent localized or spot heating of the brake discs and plates and also to provide for effecting cooling of the oil as the oil is being recirculated. It is also desirable for the oil recirculating system to be an integral part of the motor brake unit in order to avoid the need for an auxiliary oil pump system.

While a positive or effective recirculation of the cooling oil significantly extends the operational life of the brake discs and plates, it is still sometimes necessary to replace the brake discs and plates after an extended period of use. Thus it is also desirable for the motor brake unit to be constructed for conveniently and quickly replacing the brake discs and plates without requiring substantial disassembly of the motor brake unit. For example, in order to replace the brake discs and plates within either of the motor brake units disclosed in the above mentioned U.S. Pat. No. 3,680,666, it is necessary to disassemble the bearing which supports the outer end portion of the sleeve mounted on the motor shaft or to provide for pulling the sleeve from the motor shaft using the center hole within the sleeve. These motor brake units also do not provide for any positive or effective recirculation of the cooling oil outwardly between the brake discs and plates during operation of the brake unit.

SUMMARY OF THE INVENTION

The present invention is directed to an improved electric motor oil shear brake unit which provides all of the desireable features and advantages mentioned above, including a positive self-contained oil recirculating system, effective cooling of the recirculating oil and an assembly which provides for rapid and convenient replacement of the brake discs and/or brake plates. In addition, the motor brake unit of the invention is relatively inexpensive in construction and relatively easy to assemble onto the end bearing bracket of an electric motor having a double-ended projecting shaft.

The above mentioned features and advantages of a motor brake unit constructed in accordance with the invention are generally provided by a unit incorporating an annular hub member which is rigidly clamped to one projecting end portion of the motor shaft by a tapered sleeve unit. The hub member supports a plurality or set of annular brake discs for rotation with the hub member and for relative axial movement, and a plurality or set of annular brake plates interfit between the brake discs and are supported for relative axial non-rotating movement by an intermediate section of a housing which has a base section for mounting on the motor bearing bracket. The intermediate section of the housing encloses a non-rotating annular piston which is spring actuated to clamp the rotating brake discs to the non-rotating brake plates and is fluid actuated to release the braking action.

The annular hub member also defines an inlet for receiving a liquid coolant or oil which is pumped or forced by the hub member outwardly between the brake discs and plates, and the housing includes an end closure section which defines passages for recirculating the cooling oil from the brake plates and discs back to the inlet within the hub member. The housing closure section is also effective to transfer heat from the recirculating oil and dissipate the heat to the surrounding air to aid in providing the motor brake unit with an extended operational life of hundreds of thousands of successive braking operations.

Other features and advantages of the invention will be apparent from the following description, the accompanying drawing and the appended claims.

BRIEF DESCRIPTION OF THE DRAWING

FIG. 1 is an axial section of an improved electric motor brake unit constructed in accordance with the invention and showing the unit assembled onto an electric motor shown in part section;

FIG. 2 is a radial section taken generally on the line 2—2 of FIG. 1; and

FIG. 3 is a radial section similar to FIG. 2 and taken generally on the line 3—3 of FIG. 1.

DESCRIPTION OF THE PREFERRED EMBODIMENT

FIGS. 1–3 illustrate a motor brake 10 which mounts on an end bearing bracket 12 of an electric motor 15. The motor 15 has a rotor shaft 16 which is rotatably supported at each end of the motor by an anti-friction bearing 17 retained within a hub portion 18 of the bearing bracket 12. The motor 15 is of the double-ended type with the shaft 16 having an end portion 21 which projects outwardly from each end bearing bracket 12. As illustrated, the motor end bracket 12 has a standard end face 22, and the shaft 21 has a keyway 23.

In accordance with the present invention, the motor brake unit 10 includes an annular hub member 26 having a cylindrical portion 27 which slidably receives the shaft portion 21. The hub member 26 also has a frustoconical or tapered bore 29 which receives a mating tapered sleeve 31 having an inner bore for slidably receiving the shaft portion 21 and a slot for receiving an interlocking key 33. As shown in FIGS. 1 and 3, a pair of set screws 36 provide for drawing or forcing the sleeve 31 into the tapered bore 29 for rigidly clamping or locking the hub member 26 to the motor shaft portion 21. This rigid coupling enables the hub member 26 to be supported only by the shaft portion 21 and eliminates any vibration between the hub member and the shaft portion.

The hub member 26 also defines a stepped bore 38 which extends from a substantially cylindrical inlet 39 defined by an outer end portion 41 of the hub member 26. The hub portion 41 defines a set of four circumferentially spaced slots or passages 42 which extend outwardly from the inlet 39 to a splined outer surface 44 on the hub member portion 41. A plurality or set of annular brake discs 46 are mounted on the splined surface 44 so that they rotate with the hub member 46 but are free to slide axially on the splined surface 44. An expansion-type "freeze" plug 48 is expanded within the bore 38 and includes two mating sheet metal cups which are drawn together for expansion by tightening a threaded fastener 49. As will be apparent later, the plug 48 prevents any flow of a fluid or liquid coolant through the bore 38, but provides for convenient access to the locking screws 36 and sleeve 31.

The motor brake unit 10 also includes a cast metal housing 50 which is formed in three sections, a motor mounting base section 52, an intermediate section 54 and a closure section 56, each of which is a separate metal casting formed and machined to the configuration shown in the drawings. The motor mounting base section 52 surrounds the shaft portion 21 and is secured to the motor face 22 by a series of peripherally spaced socket head screws 58. The inner portion of the housing section 52 retains an annular seal 61 which forms a fluid-tight seal between the housing section 52 and a hardened metal sleeve 63 mounted on the cylindrical portion 27 of the hub member 26 which rotates with the motor shaft 16. The housing section 52 is also provided with a set of circumferentially spaced cavities or bores 66 each of which receives a compression coil spring 68.

The intermediate housing section 54 includes an inwardly projecting annular portion and a set of four circumferentially spaced lugs 73 which project outwardly towards the closure section 58 and retain a plurality or set of annular brake plates 76 having notches for receivng the lugs 73. The non-rotating brake plates 76 project inwardly between the brake discs 46 in interfitting relation and are free to move axially on the lugs 73. Preferably, the brake discs 46 and brake plates 76 are constructed as disclosed in above-mentioned Patent No. 3,638,773 which issued to Applicant's assignee. That is, each face of each brake discs 46 has radially extending V-shaped grooves to define coolant or oil passages between the discs and plates when they are pressed together.

The intermediate housing section 54 defines an annular chamber 78 which receives a cast metal piston 80 which is supported for axial sliding movement within the chamber 78. A set of resilient rings 82 and 83 make the chamber 78 fluid-tight on the right side of the piston 80 (FIG. 1). Pressurized fluid or air is supplied to the chamber 78 through a passage 86 when it is desired to move the piston 80 and release the brake, as will be explained later.

The piston 80 includes an inner annular portion 88 which has a radial face for engaging the innermost brake plate 76, and a series of circumferentially spaced passages 89 (FIGS. 1 and 3) extend axially through the piston 80 outboard of the annular portion 88. Spaced between the passages 89, the piston 80 is provided with a series of circumferentially spaced cavities or bores 92 which oppose the corresponding bores 66 within the housing section 52 and receive the compression springs 68. As shown in FIGS. 1 and 3, the intermediate housing section 54 is coupled or secured to the housing section 52 by a series of circumferentially spaced screws 94 which are angularly offset from the mounting screws 58.

The cast aluminum pan-like closure section 56 of the housing 50 includes an annular portion 96 extending from an outwardly projecting flange portion 97 which is secured to the intermediate housing section 54 by a series of peripherally spaced screws 98. The closure section 56 is also cast with a radial end wall 101 from which projects parallel spaced heat radiating ribs or fins 102. As shown in FIG. 1, the end wall 101 of the closure section 56 opposes the inlet 39 within the hub member 26, and the closure section 56 has an integrally cast ring portion 104 which engages the outermost brake plate 76 and opposes the annular or ring portion 88 of the piston 80. The ring portion 104 is supported by a cylindrical portion 106 which defines a chamber 108 and is interrupted by three circumferentially spaced ports or passages 110 (FIGS. 1 and 2). The passages 110 connect the center chamber 108 with an annular chamber 112 which surrounds the brake discs 46 and brake plates 76 and which receives the outwardly projecting lugs 73 supporting the brake plates 76.

As mentioned above, the housing 50 is partially filled with a liquid coolant or oil to a level which is approximately on the axis of the motor shaft 16. This coolant or oil may be supplied to the housing through an opening 114 within the top portion of the closure section 56 and which is normally closed by an air breather unit 116. The unit 116 permits venting of the interior of the housing 50 and prevents the air from being pressurized when the air is heated during operation of the brake unit. The coolant or oil may also be added to the housing 50 through a side opening which is closed with a plug 117, and the oil is drained from the housing 50 by removing a drain opening plug 118.

In operation of the motor brake unit 10, the motor shaft 16 is normally braked by clamping of the brake discs 46 between the brake plates 76 in response to the force exerted by the compression springs 68. When it is desired to release the brake, pressurized fluid or air is supplied to the chamber 78 through the passage 86 so that the piston 80 moves towards the left (FIG. 1) and releases the spring clamping pressure on the brake discs and plates. When the motor shaft 16 and the hub member 26 are rotating, the annular portion 41 of the hub member and the rotating brake discs 46 function as a pump impeller causing the coolant or oil within the housing 50 to be forced outwardly through the passages 42 and between the brake discs 46 and brake plates 76. This outward flow of oil is received within the annular chamber 112 and recirculates to the inlet 39 through the passage 110 and chamber 108 within the closure section 56. When the brake discs 46 and brake plates 76 are clamped together by releasing fluid pressure within the chamber 78, the friction heat developed within the brake discs and plates transfers to the recirculating oil. The heat within the oil is then transferred to the closure section 56 of the aluminum housing 50 where the heat is radiated or dissipated to the air surrounding the brake unit 10.

From the drawing and the above description, it is apparent that a motor brake unit constructed in accordance with the present invention, provides desirable features and advantages. For example, the motor brake unit 10 incorporates a positive recirculating oil pump and heat transmission system which effectively transfers friction heat from the brake discs 46 and brake plates 76 to the atmosphere. As a result, the brake discs and plates have an extended useful life and provide for repetitively braking the motor shaft 16 through many thousand braking operations. An another important feature, it is apparent that after the oil is drained from the housing 50, the brake discs 46 and brake plates 76 may be quickly and easily removed and replaced simply by removing the closure section 56 of the housing. Furthermore, after the closure section 56 is removed, it is apparent that the hub member 26 may be easily removed from the motor shaft portion 21, for example, if it is desired to replace the seal 61. It is also apparent that since there is no bearing supporting the outer end portion of the hub member 26, it is unnecessary to remove a bearing in order to remove either the closure section 56 of the housing 50 or the brake discs and plates.

While the form of oil shear brake unit herein described constitutes a preferred embodiment of the invention, it is to be understood that the invention is not limited to this precise form of brake, and that changes may be made therein without departing from the scope and spirit of the invention as defined in the appended claims.

The invention having thus been described, the following is claimed:

1. An improved brake unit adapted to be mounted on a motor for quickly stopping the rotation of a shaft projecting from the motor, said brake unit comprising a hub member having a center bore for receiving the shaft and including an annular portion projecting axially from a mounting portion adapted to engage the shaft to define a liquid coolant inlet, means for rigidly securing said hub member to the shaft, a plurality of annular brake discs mounted on said annular portion of said hub member for rotation therewith and for axial movement relative to said hub member, said annular portion of said hub member having circumferentially spaced and generally radially extending passages connecting said inlet to the inner portions of said brake discs, a housing surrounding said hub member, a liquid coolant within said housing, means connected to said housing and supporting a plurality of non-rotatable annular brake plates disposed between said brake discs in interfitting relation, said coolant being forced outwardly from said inlet through said passages and between said brake discs and plates in response to rotation of said hub member and said brake discs, an annular non-rotating piston supported by said housing concentrically with said hub member and for axial movement relative to said hub member, means for moving said piston axially to effect axial compression and release of said brake discs and plates, said housing including an end closure portion for confining said coolant within said housing, and means defining a passage within said housing for recirculating the coolant from said brake discs and plates and within the lower portion of said housing to said inlet of said hub member.

2. A brake unit as defined in claim 1 wherein said means for securing said hub member to said shaft comprise means defining a tapered bore within said hub member, a tapered sleeve for receiving the shaft and mating with said tapered bore, and means accessible through said inlet for forcing said sleeve axially into said bore to form a rigid coupling of said sleeve to said shaft with said shaft forming the only support for said hub member.

3. A brake unit as defined in claim 1 wherein said end closure portion of said housing comprises a cast metal closure section having a center portion opposing said coolant inlet on said hub member.

4. A brake unit as defined in claim 3 wherein said closure section comprises a plurality of integrally cast and outwardly projecting spaced fins for dissipating heat transferred to said closure section by the recirculating coolant.

5. A brake unit as defined in claim 3 wherein said closure section includes an end wall and a ring portion spaced inwardly from said end wall adjacent said brake discs and plates, and means defining at least one passage between said end wall and said ring portion below the axis of said hub member for directing coolant from the lower portion of said housing to said inlet.

6. A brake unit as defined in claim 1 and including releasable sealing means disposed within said inlet and engaging said hub member for preventing the flow of coolant between said shaft and said hub member.

7. A brake unit as defined in claim 6 wherein said sealing means comprise a two-section expandable plug, and a threaded fastener connecting said sections and effective to expand said plug against said hub member.

8. A brake unit as defined in claim 1 wherein said housing comprises an annular portion releasably coupled to said closure portion and having a plurality of angularly spaced lugs projecting toward said closure portion, said brake plates being supported by said lugs, and said lugs provide for removing said brake plates axially from said lugs after removing said closure portion from said annular portion.

9. A brake unit as defined in claim 1 wherein said housing includes a base section and a closure section spaced with an intermediate section therebetween, a first set of threaded fasteners for securing said base section to the motor, a second set of threaded fasteners securing said intermediate section to said base section, a third set of threaded fasteners securing said closure section to said intermediate section, and said intermediate section including a plurality of angularly spaced lugs supporting said brake plates and providing for removing said brake plates from said lugs without removing said base section.

10. A brake unit as defined in claim 9 wherein said closure section includes a thrust opposing ring portion supported inwardly adjacent said brake plates and discs by a generally cylindrical portion defining a coolant recirculating chamber opposing said inlet on said hub member, and means defining at least one oil recirculating passage within the lower part of said cylindrical portion.

11. A brake unit as defined in claim 1 and including means defining circumferentially spaced oil recirculating passages extending through said piston.

12. A brake unit as defined in claim 1 wherein said means for rigidly securing said hub member to the shaft includes a member clamping the shaft to provide for supporting said hub member solely by the shaft.

13. An improved brake unit adapted to be mounted on a motor for quickly stopping the rotation of a shaft projecting from the motor, said brake unit comprising a hub member having a center bore for receiving the shaft and including an annular portion projecting axially from a mounting portion adapted to engage the shaft to define a liquid coolant inlet, means for rigidly securing said hub member to the shaft, a plurality of annular brake discs mounted on said annular portion of said hub member for rotation therewith and for axial movement relative to said hub member, said annular portion of said hub member having circumferentially spaced and generally radially extending passages connecting said inlet to the inner portions of said brake discs, a housing surrounding said hub member and including an annular base section coupled to a closure section by an annular intermediate section, means connected to said intermediate section of said housing and supporting a plurality of non-rotatable annular brake plates disposed between said brake discs in interfitting relation, fastener means for securing said base section of said housing to the motor, a liquid coolant within said housing, said coolant being forced outwardly from said inlet through said passages and between said brake discs and plates in response to rotation of said hub member and said brake discs, an annular non-rotating piston supported by said intermediate section of said housing for axial movement relative to said hub member, means for moving said piston axially to effect axial compression and release of said brake discs and plates, means defining passages within said housing for recirculating said coolant from the periphery of said brake discs and plates to said inlet of said hub member, and said closure section of said housing including a portion spaced axially from the shaft and opposing said inlet.

14. A brake unit as defined in claim 13 wherein said closure section includes an end wall opposing said inlet, a ring portion spaced inwardly from said end wall adjacent said brake discs and plates, and means defining at least one passage between said end wall and said ring portion below the axis of said hub member for directing coolant from the lower portion of said closure section to said inlet.

15. A brake unit as defined in claim 13 and including expandable plug means disposed within said inlet and engaging said hub member for preventing the flow of coolant between said shaft and said hub member.

16. A brake unit as defined in claim 13 wherein said supporting means on said intermediate section of said housing comprise a plurality of angularly spaced lugs projecting axially toward said closure section, said brake plates being prevented from rotating by said lugs, and said lugs provide for removing said brake plates axially from said lugs after removing said closure section from said intermediate section.

* * * * *